United States Patent
McCormick

(10) Patent No.: US 11,329,717 B2
(45) Date of Patent: May 10, 2022

(54) PACKET FORWARDING INCORPORATING PARTIAL SORTING OF PATH COSTS OR UTILITIES

(71) Applicant: William Carson McCormick, Ottawa (CA)

(72) Inventor: William Carson McCormick, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/882,952

(22) Filed: May 26, 2020

(65) Prior Publication Data
US 2021/0376914 A1    Dec. 2, 2021

(51) Int. Cl.
*H04L 12/741*    (2013.01)
*H04L 12/721*    (2013.01)
(Continued)

(52) U.S. Cl.
CPC ..... *H04B 7/18513* (2013.01); *H04B 7/18519* (2013.01); *H04L 45/12* (2013.01);
(Continued)

(58) Field of Classification Search
CPC . H04B 7/18513; H04B 7/18519; H04L 45/74; H04L 69/22; H04L 45/12;
(Continued)

(56) References Cited

U.S. PATENT DOCUMENTS 5,930,348 A    7/1999    Regnier et al.
6,147,980 A    11/2000   Yee et al.
(Continued)

FOREIGN PATENT DOCUMENTS

CN    1681257 A    10/2005
CN    101119372 A    2/2008
(Continued)

OTHER PUBLICATIONS

Edoardo Benzi et al "Optical Inter-Satellite Communication: the Alphasat and Sentinel-1A in-orbit experience" SpaceOps Conferences, May 16-20, 2016, Daejeon, Korea; 14th International Conference on Space Operations.
(Continued)

*Primary Examiner* — Mohamed A Kamara

(57) ABSTRACT

A method and apparatus for routing packets in a network, such as a satellite mesh network. For each one of multiple destination devices capable of further handling of the packet for routing to a destination (e.g. ground station) a respective cost or utility associated with forwarding the packet to that destination device is determined. For a given value k, an unsorted subset of k of the destination devices for which said costs are lowest or said utilities are highest is determined, without necessarily fully sorting the plurality of destination devices by cost or utility. The data packet is then forwarded to a selected one of this subset of destination devices. Cost may correspond to distance from destination device (e.g. satellite) to the further destination. Sorting networks and selector networks can be used, for example as implemented in hardware, to generate the unsorted subset.

20 Claims, 12 Drawing Sheets

(51) Int. Cl.
*H04B 7/185* (2006.01)
*H04L 45/74* (2022.01)
*H04L 45/00* (2022.01)
*H04L 45/12* (2022.01)
*H04L 47/2441* (2022.01)
*H04L 69/22* (2022.01)

(52) U.S. Cl.
CPC .............. *H04L 45/38* (2013.01); *H04L 45/54* (2013.01); *H04L 45/74* (2013.01); *H04L 47/2441* (2013.01); *H04L 69/22* (2013.01)

(58) Field of Classification Search
CPC ..... H04L 45/38; H04L 47/2441; H04L 45/54; H04L 43/08
See application file for complete search history.

(56) References Cited

U.S. PATENT DOCUMENTS

| | | | |
|---|---|---|---|
| 6,208,295 | B1 | 3/2001 | Dogan |
| 6,804,199 | B1* | 10/2004 | Kelly .................. H04L 45/00 370/238 |
| 6,816,460 | B1 | 11/2004 | Ahmed et al. |
| 7,613,121 | B2* | 11/2009 | Chou .................. H04L 45/12 370/231 |
| 7,945,272 | B2 | 5/2011 | Kim |
| 10,796,251 | B2 | 10/2020 | Mason, Jr. et al. |
| 2005/0198286 | A1 | 9/2005 | Xu |
| 2006/0218225 | A1 | 9/2006 | Hee Voon et al. |
| 2007/0147254 | A1* | 6/2007 | Larsson ................ H04W 52/46 370/238 |
| 2007/0239349 | A1 | 10/2007 | Ohnishi et al. |
| 2009/0046732 | A1 | 2/2009 | Pratt, Jr |
| 2010/0008368 | A1* | 1/2010 | Karloff ................ H04L 45/00 370/400 |
| 2012/0014316 | A1 | 1/2012 | Rahman |
| 2012/0173527 | A1 | 7/2012 | Thiesson |
| 2012/0238235 | A1 | 9/2012 | Lee |
| 2013/0036236 | A1 | 2/2013 | Morales et al. |
| 2013/0232565 | A1 | 9/2013 | O'Connor et al. |
| 2014/0044008 | A1 | 2/2014 | Skalecki et al. |
| 2014/0165163 | A1 | 6/2014 | Salkintzis |
| 2014/0177522 | A1 | 6/2014 | Marshack |
| 2014/0229405 | A1 | 8/2014 | Govrin |
| 2014/0278590 | A1 | 9/2014 | Abbassi |
| 2014/0379929 | A1 | 12/2014 | Cicic et al. |
| 2016/0057004 | A1 | 2/2016 | Ge |
| 2016/0323175 | A1 | 11/2016 | Liu |
| 2017/0239394 | A1 | 8/2017 | Fromm et al. |
| 2019/0104056 | A1* | 4/2019 | Poorrezaei .............. H04L 45/22 |
| 2019/0356498 | A1 | 11/2019 | Hernandez Sanchez et al. |
| 2020/0382445 | A1 | 12/2020 | Calmon |
| 2021/0194808 | A1 | 6/2021 | McCormick |
| 2022/0026519 | A1 | 1/2022 | Wu et al. |

FOREIGN PATENT DOCUMENTS

| | | | | |
|---|---|---|---|---|
| CN | 102118456 | A | 7/2011 | |
| CN | 104579454 | A | 4/2015 | |
| CN | 105657777 | A | 6/2016 | |
| CN | 107231183 | A | 10/2017 | |
| CN | 107979409 | A | 5/2018 | |
| CN | 108390713 | A | 8/2018 | |
| CN | 108989223 | A | 12/2018 | |
| CN | 110505153 | A | 11/2019 | |
| EP | 2853068 | A1 | 4/2015 | |
| EP | 2853068 | A1 * | 4/2015 | ............. H04L 45/20 |
| WO | 2016069077 | A1 | 5/2016 | |
| WO | 2019173127 | A1 | 9/2019 | |

OTHER PUBLICATIONS

Hemani Kaushal et al "Optical Communication in Space: Challenges and Mitigation Techniques"; Citation information DOI: 10.1109/COMST.2016.2603518, IEEE Communications Surveys & Tutorials.

M. Gregory et al "TESAT laser communication terminal performance results on 5.6Gbit coherent inter satellite and satellite to ground links"; International Conference on Space Optics—ICSO 2010, Rhodes Island, Greece, Oct. 4-8, 2010.

Zengyin Yang et al "Modeling and Routing for Predictable Dynamic Networks"; arXiv.org > cs > arXiv: 1704.00885; Aug. 17, 2018.

"Iridium Next: A Global Effort to Launch the Future of Global Communications"; Apr. 19, 2013 | Featured Stories, Iridium Next.

Hueseyin Uzunalioglu et al "A routing algorithm for connectionoriented Low Earth Orbit (LEO) satellite networks with dynamic connectivity"; Published 2000 • Computer Science • Wireless Networks.

Fargnoli, Joseph D. (2016), Technical Narrative, Theia Holdings A, Inc. (Theia Satellite Network), 1455 Pennsylvania Ave., Ste 600, Washington, DC, District of Columbia, United States.

"Geographic Routing"; Wikipedia, Nov. 20, 2019; https://en.wikipedia.org/wiki/Geographic_routing.

"Chapter 6 Geometric Routing" Mobile Computing Winter 2005 / 2006; https://disco.ethz.ch/courses/ws0506/mobicomp/lecture/6/Chapter6GeometricRouting4Slides_v2.pdf.

"Haversine Formula", Wikipedia, Aug. 7, 2019; https://en.wikipedia.org/wiki/Haversine_formula.

Sahhaf et al. Scalable and energy-efficient Optical Tree-based Greedy Router, 2013 15th International Conference on Transparent Optical Networks (ICTON) ,Sep. 19, 2013, 5 pages.

McCormick, William Carson et al., U.S. Appl. No. 16/721,171, filed Dec. 19, 2019.

Halabian, Hassan et al., U.S. Appl. No. 16/888,023, filed May 29, 2020.

Ashwood-Smith, Peter et al., U.S. Appl. No. 16/887,675, filed May 29, 2020.

Akhavain Mohammadi, Mehdi Arashmid, U.S. Appl. No. 17/117,333, filed Dec. 10, 2020.

Akhavain Mohammadi, Mehdi Arashmid et al., U.S. Appl. No. 17/141,824, filed Jan. 5, 2021.

Akhavain Mohammadi, Mehdi Arashmid, U.S. Appl. No. 17/140,668, filed Jan. 4, 2021.

Akhavain Mohammadi, Mehdi Arashmid, U.S. Appl. No. 17/167,540, filed Feb. 4, 2021.

* cited by examiner

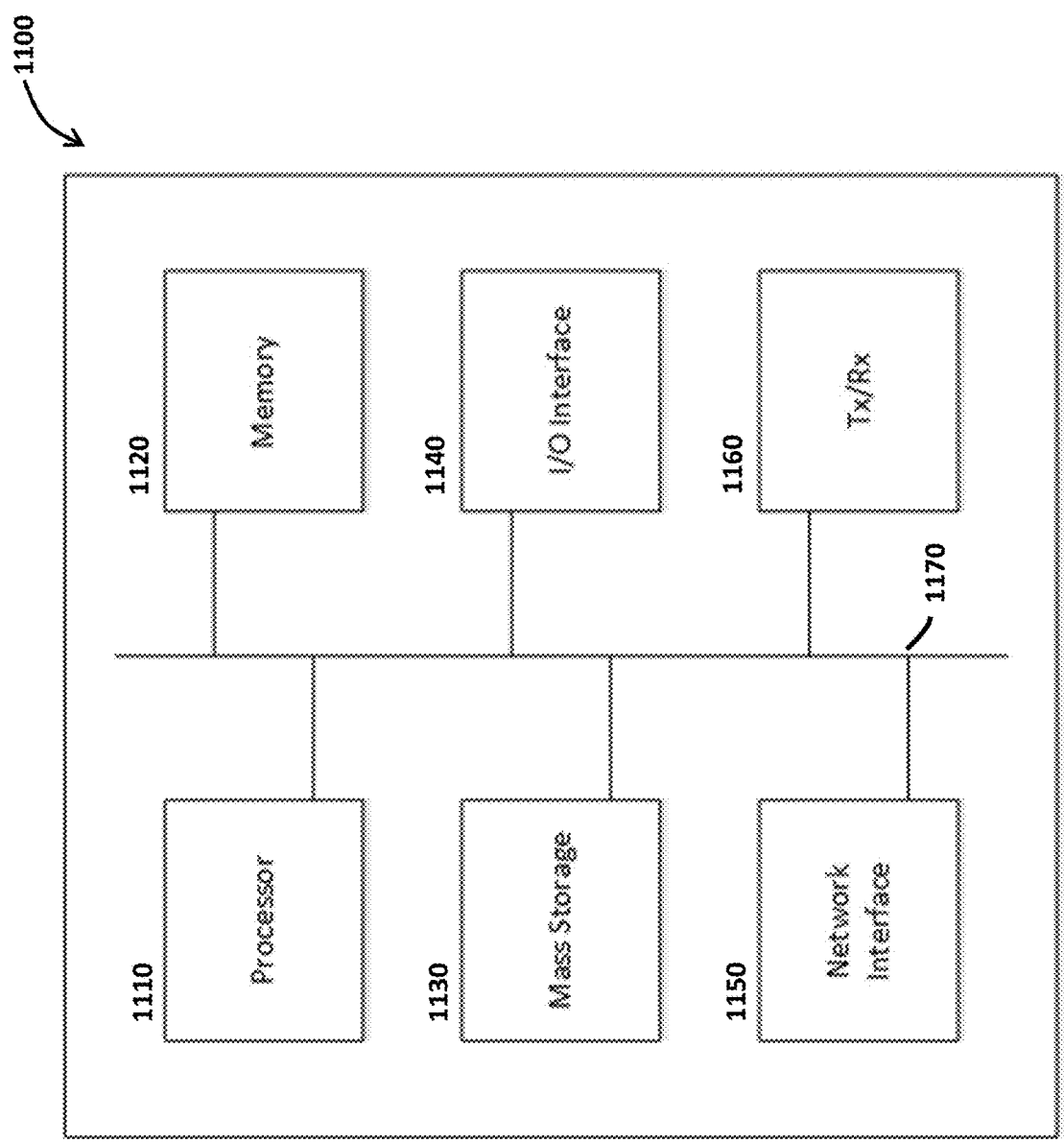

PACKET FORWARDING INCORPORATING PARTIAL SORTING OF PATH COSTS OR UTILITIES

CROSS-REFERENCE TO RELATED APPLICATIONS

This is the first application filed for the present invention.

FIELD OF THE INVENTION

The present invention pertains to packet-based data networks, such as optical satellite mesh networks, and in particular to a method and apparatus for supporting packet forwarding in such networks.

BACKGROUND

Low earth orbit (LEO) satellite constellations are being developed to provide, among other things, internet routing services. It is currently proposed that a group of satellites would be distributed in space and organized into a mesh network. Free space optical (i.e. laser) links are proposed as one way for providing high-bandwidth network connectivity between satellites. Other types of links, such as radiofrequency or microwave-based links are also possible.

Data packets can be routed through the satellite mesh network along a variety of paths. Because the satellites are moving rapidly with respect to the surface of the earth, routing of packets toward an earth-based destination requires consideration of satellite locations and proximity to the destination location. Rapidly computing effective routing paths in such scenarios is computationally intensive and current routing methods are subject to improvement and customization to satellite mesh networking.

Geographic routing involves routing of packets based on geographic position information without necessarily relying on knowledge of network topology. Such routing schemes are known for wireless networks but have not been extensively developed for satellite networks. Furthermore, these schemes are subject to improvement in terms of computational efficiency, applicability to scenarios to satellite mesh networks, or both.

Therefore, there is a need for a method and apparatus for supporting packet forwarding in satellite mesh networks and similar networks that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for packet forwarding, for example in satellite networks utilizing multipath forwarding, in which path costs or utilities are partially sorted. The sorting is sufficient to identify a set of k next destinations with lowest costs or highest utilities, but without having to fully sort these next destinations by cost.

In accordance with embodiments of the present invention, there is provided a method for routing a data packet in a network. The method includes, for each one of a plurality of destination devices capable of further handling of the data packet for routing to a further (e.g. final) destination, determining a respective cost or utility associated with forwarding the data packet to said one of the plurality of destination devices. The method includes, for a predetermined value k, determining an unsorted subset of k of the destination devices for which said costs are lowest or said utilities are highest. The method includes selecting one of the subset of the destination devices. The method includes forwarding the data packet to said selected one of the subset of the destination devices.

In accordance with embodiments of the present invention, there is provided an apparatus for routing a data packet in a network. The apparatus includes a cost determiner configured, for each one of a plurality of destination devices capable of further handling of the data packet for routing to a further destination, to determine a respective cost or utility associated with forwarding the data packet to said one of the plurality of destination devices. The apparatus includes a destination subset selector configured, for a predetermined value k, to determine an unsorted subset of k of the destination devices for which said costs are lowest or said utilities are highest. The apparatus includes a destination selector configured to select one of the subset of the destination devices. The apparatus includes a packet forwarder configured to forward the data packet to said selected one of the subset of the destination devices.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 11 is a schematic diagram of an electronic device that may perform any or all of operations of the above methods and features explicitly or implicitly described herein, according to different embodiments of the present invention.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

When using a LEO satellite mesh network to route a packet to a ground-based destination, it is notable that the satellite constellation typically moves rapidly relative to the destination. This makes it challenging to determine, at a given time, which path to forward the packet on so that it efficiently reaches the destination. For example, it is desirable to determine which satellite is currently closest (or adequately close) to the ground destination so that the packet can be routed toward that satellite. Constellation geometry can be used to facilitate such routing. In particular, according to embodiments of the present invention, the satellite constellation can be configured to route packets to the satellite which is geometrically closest to the destination location. To facilitate this, geographic routing may be employed in which the destination address for each packet includes an indication of a geometric (geographic) location of the destination of the packet. This location can be part of the destination address, for example.

Figure 1A:
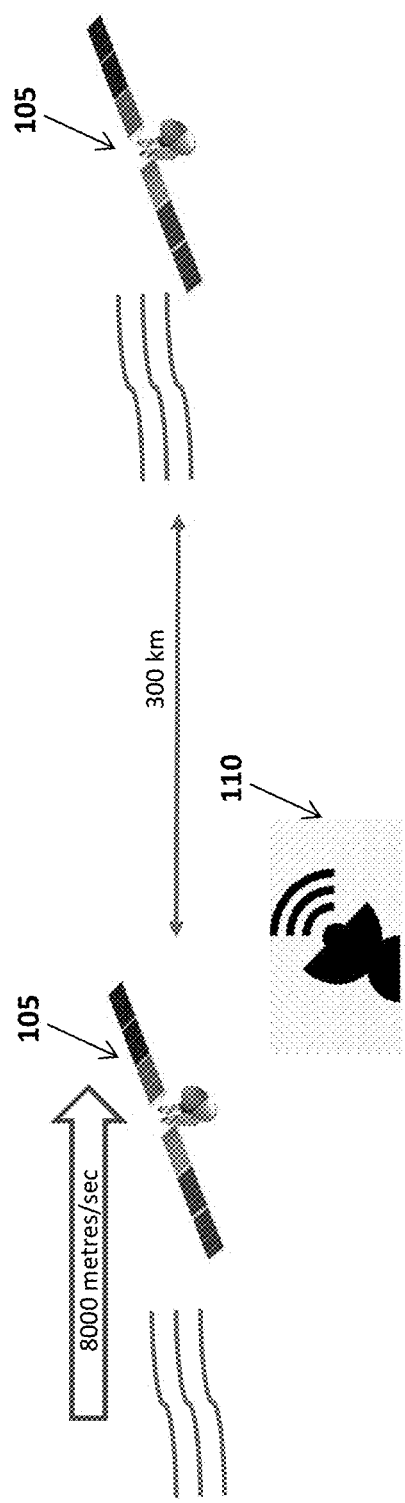
FIG. 1A illustrates a satellite moving rapidly relative to a ground-based destination communicatively coupled thereto, according to a prior art scenario to be addressed by embodiments of the present invention.

FIG. 1A illustrates a fundamental technical challenge, in which a satellite 105 moves rapidly (e.g. at 8000 m/s) relative to a ground-based destination 110. In less than one minute, an overhead satellite can be 300 km from the destination. As such, routes to a destination have to be timely updated.

Figure 1B:
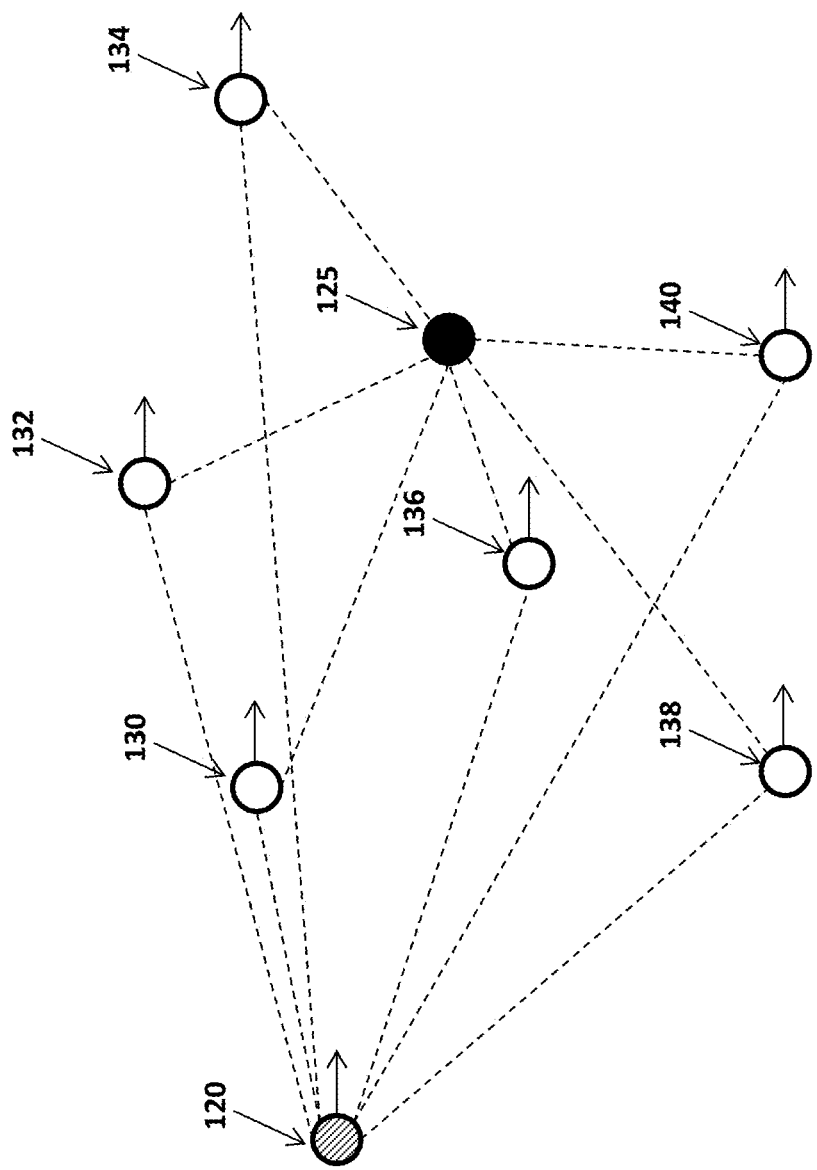
FIG. 1B illustrates part of a satellite constellation in communication with a ground-based destination, according to an embodiment of the present invention.

FIG. 1B illustrates, by way of example, part of a satellite constellation including a first satellite 120 holding a data packet for forwarding to a ground-based destination 125, and multiple intermediate satellites 130, 132, 134, 136, 138, 140. Communication links are shown by dashed lines and the satellites are moving relative to ground. Although each intermediate satellite can communicate to the destination 125, it is desirable to have communication to the destination performed by a satellite which is relatively closer to the destination. In this scenario, each of the intermediate satellites 130, 132, 134, 136, 138, 140 can directly communicate with the destination 125.

Figure 1C:
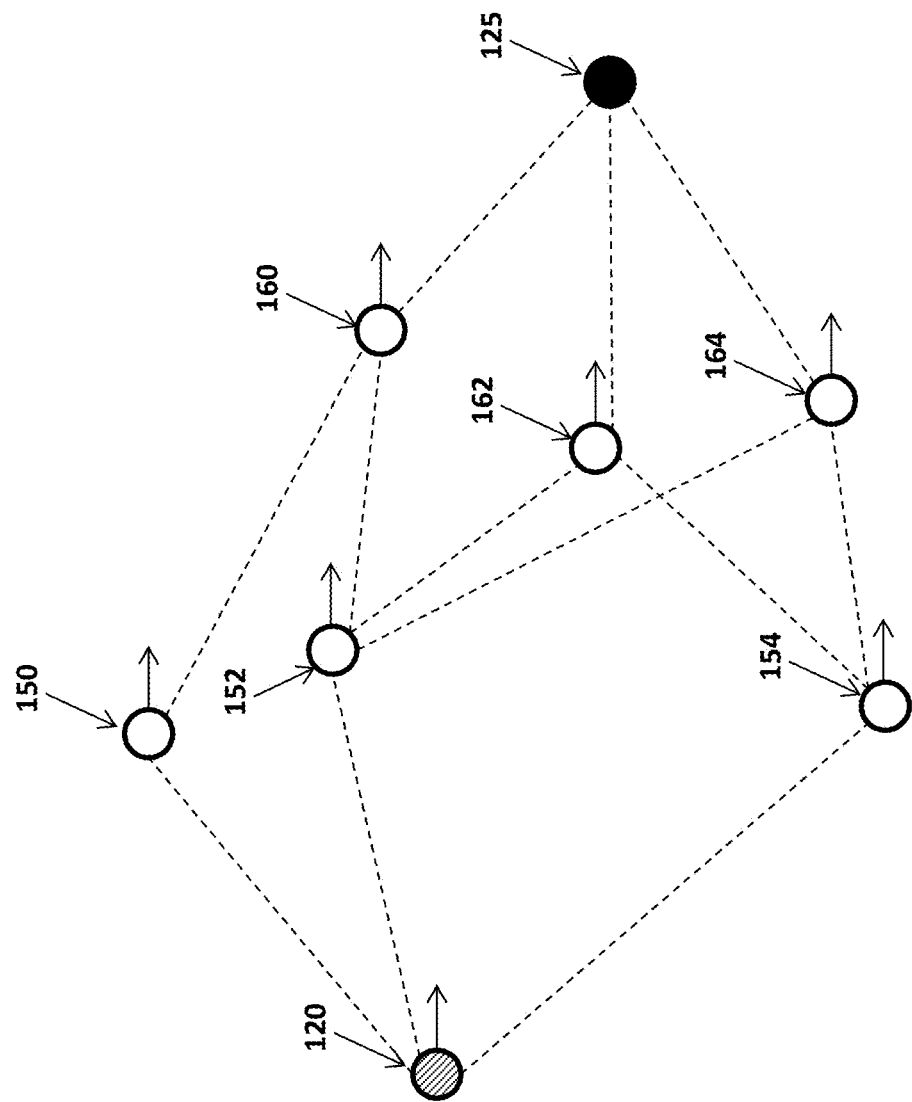
FIG. 1C illustrates part of a satellite constellation in communication with a ground-based destination, according to another embodiment of the present invention.

FIG. 1C illustrates, by way of another example, part of a satellite constellation again including a first satellite 120 holding a data packet for forwarding to a ground-based destination 125, and multiple intermediate satellites 150, 152, 154 communicatively linked to the first satellite 120 but not directly to the destination 125. Further intermediate satellites 160, 162, 164 are communicatively linked to the destination 125 but not directly to the first satellite 120. However, the intermediate satellites 150, 152, 154 are communicatively linked to the further intermediate satellites 160, 162, 164. As such, the first satellite can communicate with the destination via a three-hop path. Further scenarios with communication links involving different numbers of hops are also applicable.

It is noted that, in each of the scenarios of FIGS. 1B and 1C, each intermediate satellite to which the first satellite 120 can potentially transmit the data packet is a discernible physical distance away from the destination 125. This distance can be used to represent a type of cost associated with forwarding the packet to that particular intermediate satellite. When an intermediate satellite is further from the destination, it is considered less desirable to route the data packet to that intermediate satellite, and hence the cost is higher. This is applicable as a metric whether or not the intermediate satellite can transmit the data packet directly to the destination (although scenarios can be contrived in which the total path length traversed by the data packet is not minimized under this "greedy" forwarding approach).

More generally, given a data packet at a first location (e.g. first satellite), a cost or utility can be associated with forwarding the data packet to a destination device, such as an intermediate satellite directly communicatively coupled to the first satellite. This can be further generalized, in some instances, to destination devices indirectly coupled to the first location, however for simplicity only direct couplings are considered herein. Once such costs are utilities are determined, the destination device associated with a relatively low (or lowest) cost, or a relatively high (or highest) utility can then be selected and the data packet can be forwarded to the selected destination device. In dynamic networks such as rapidly orbiting satellite constellations or networks in which destination devices move frequently, the costs or utilities can be updated continuously or intermittently. In general, costs or utilities can reflect distance, signal quality, charges levied, bandwidth limitations, quality of service or fairness limitations, etc.

A routing system typically consists of different subsystems. Two notable subsystems are referred to herein as the control plane and the forwarding plane. The forwarding plane is also sometimes called the user plane or the data plane. The control plane is responsible for monitoring the network topology and building routes. These routes may be programmed into the forwarding plane, which uses them to actually forward the packets. The forwarding plane is often implemented in hardware for higher performance systems, and in software (for example, Linux includes an IP forwarding plane in the kernel) for lower performance systems.

In normal IP forwarding, when there are multiple routes with the same cost or utility, it is desirable to select one particular route for each flow. However, different flows between the same pair of nodes can take different ones of the multiple routes. The intent here is to multiplex among the equal cost routes to provide a form of load balancing.

In a geometry based routing system, the path costs can be based on the path distances. As such, it is less likely to have multiple routes with equal costs. However, different routes may have substantially similar costs. This is particularly applicable in a satellite mesh network. Embodiments of the present invention provide for multipath forwarding in such a system. In particular, embodiments of the present invention are configured to identify paths with similar, but not necessarily equal, costs (or utilities) and select from among such paths when it is required to forward a packet. A selector may be used to identify similar cost (or utility) paths without fully sorting of paths by cost. A thresholding function may in conjunction with the selector to identify the similar cost (or utility) paths. The paths may correspond to next-hop destinations, for example, and the interfaces associated therewith.

According to various implementations, the forwarding plane is configured with a list of data entries (tuples), each containing a destination address and a corresponding interface. To forward a packet to a given destination address, the corresponding interface is used. Interfaces may correspond to particular optical communication links, for example. Interfaces can be free space optical links between satellites for example. Different interfaces may map to different communication links. Interfaces can correspond to virtual interfaces, which in turn may correspond to one or more physical interfaces. The destination address may contain a geometric location and potentially other routing information. As is common with geometric or geographic routing, the destination address may indicate a physical location rather than a network-based location (e.g. numerical identifiers in a list of successive subnets).

When the forwarding plane is operating, it will receive a stream of packets to be forwarded (for example at a rate on the order of $10^8$ packets per second). For each packet, the forwarding plane is configured to inspect the list of destination addresses, select a set of addresses with minimum cost or maximum utility according to a metric such as a distance-based metric, and then select one of those addresses to which to forward the packet. The interface associated with the address is used for forwarding the packet.

Figure 2:
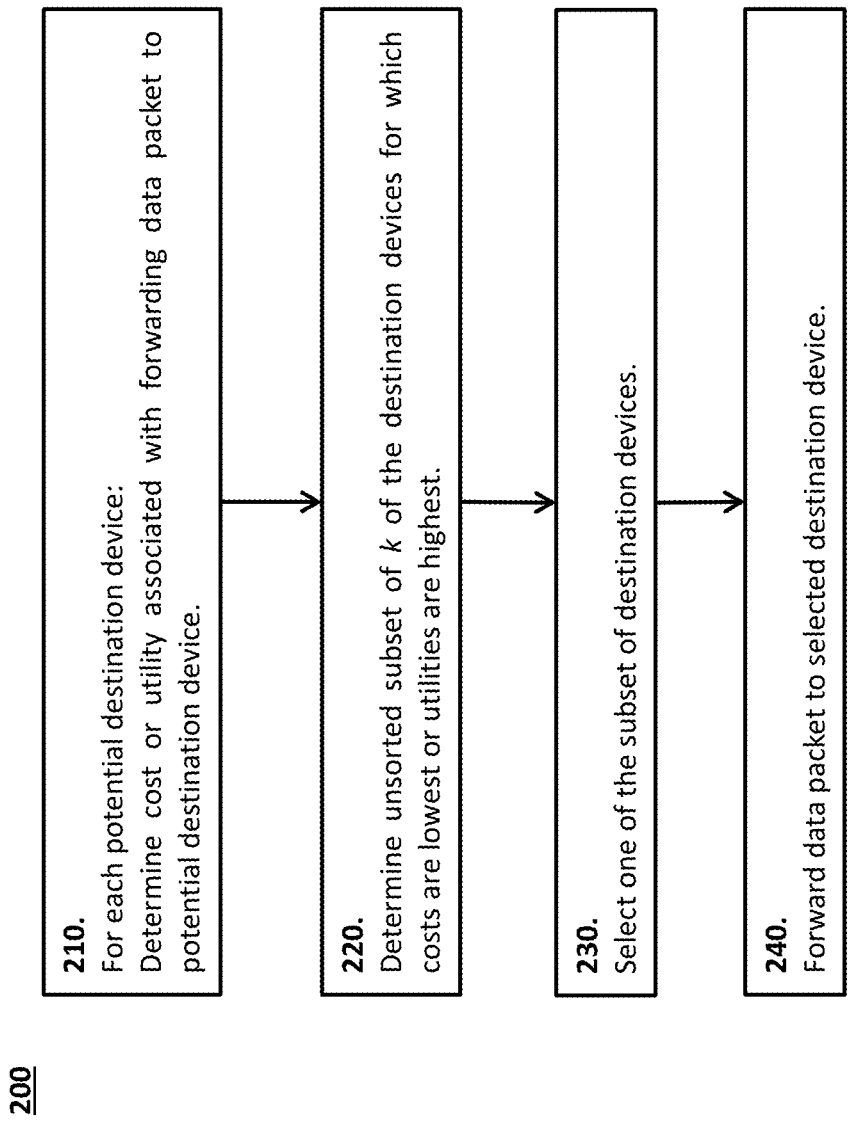
FIG. 2 illustrates a method for routing a data packet in a network, according to embodiments of the present invention.

Accordingly, and with reference to FIG. 2, embodiments of the present invention provide for a method 200 for routing a data packet in a network. The method may be implemented in the forwarding plane. The method includes, for each one of a plurality of destination devices capable of further handling of the data packet for routing to a further destination, determining 210 a respective cost or utility associated with forwarding the data packet to that one of the plurality of destination devices. The method includes, for a predetermined value k (e.g. 8, 16, 1000), determining 220 an unsorted subset of k of the destination devices for which those costs are lowest or those utilities are highest. Notably, determining the subset may be performed without fully sorting the destination devices by cost or utility, for example using a selector such as an Alexseev selector, as described elsewhere herein. The method further includes selecting 230 one of the subset of the destination devices. This selecting can include a filtering step, such that only members of the subset having costs or utilities within a given range are candidates for selection. That is, even if the k destination devices with smallest costs are initially provided as candidates for selection, some of these destination devices may have costs (in terms of actual, not relative value) that are significantly higher than others. The destination devices with such higher costs may be eliminated from selection, for example if the costs are above a given threshold value. The selecting can further be based on addressing information contained within the data packet. For example, a hash value may be generated based on the addressing information, and the destination device can be selected based on the hash value. In this way, data packets with the same addressing information (e.g. source and destination address and optionally port number) will traverse the same path. The method further includes forwarding 240 the data packet to said selected one of the subset of the destination devices.

It is noted that the cost or utility is a cost or utility associated with forwarding the data packet from the one of the plurality of destination devices toward a potentially final (referred to as further) destination, such as a ground-based terminal. In the typical example implementations described herein, the cost corresponds to a distance (e.g. in an orbital or spherical surface plane) from the one of the plurality of destination devices (e.g. another satellite) to the further destination (e.g. ground station).

Figure 3:
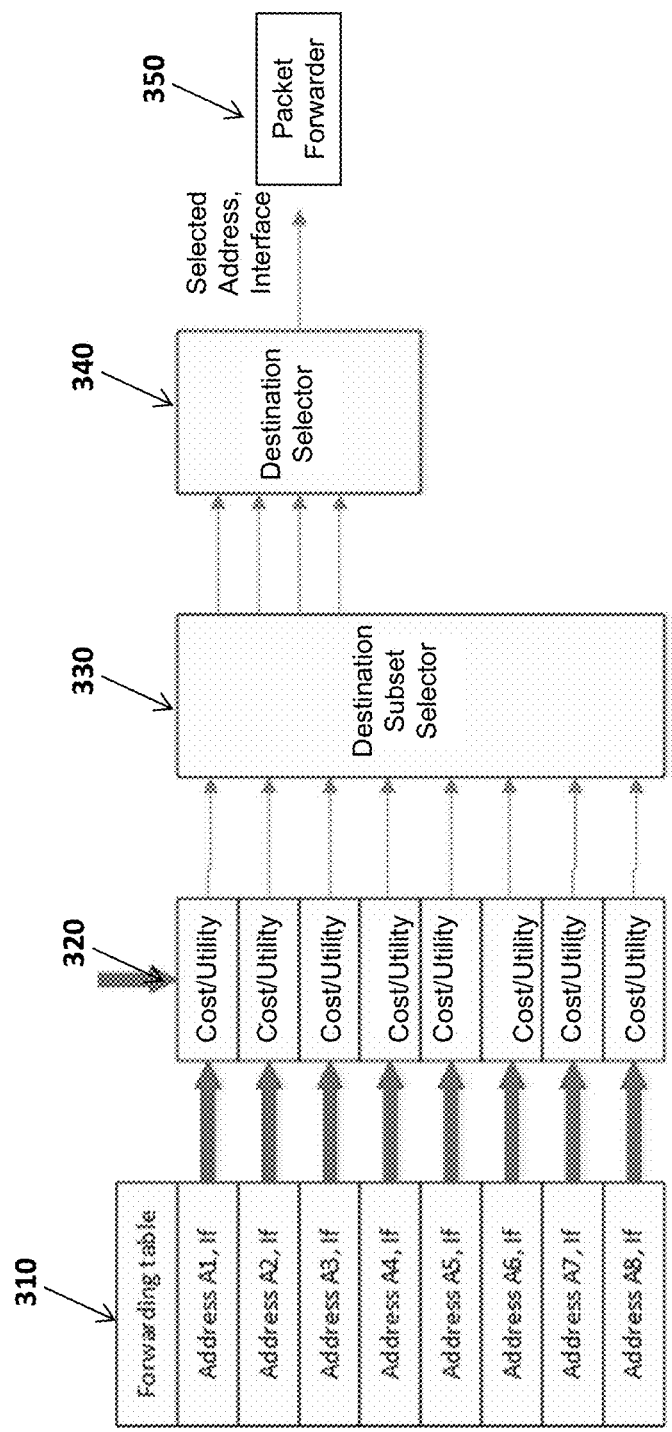
FIG. 3 is a block diagram illustrating forwarding plane operation according to an embodiment of the present invention.

FIG. 3 is a block diagram illustrating forwarding plane operation according to an embodiment of the present invention. A forwarding table 310 contains a set of destination device addresses and the corresponding interfaces usable to forward packets to such destination devices. Although eight destination devices addresses are shown, more or fewer addresses may be present. A cost determiner 320 is provided and configured, for each destination device address, to determine the respective cost or utility associated with forwarding the data packet to that destination device. As mentioned above, the cost may correspond to or otherwise be based on distance from the destination device to a further destination device such as a ground station. A destination subset selector 330 receives the destination device addresses and costs and determines a subset of k of the destination devices for which costs are lowest or utilities are highest. The destination subset selector may thus select the k destination devices, out of n available destination devices, which are closest to the further destination.

Output of the destination subset selector 330, namely k indications of the selected k destination devices, is provided to a destination selector 340. The destination selector selects one of the k destination devices to which the data packet is to be forwarded. In some embodiments, the selection may include a thresholding operation, a hashing operation, or both.

The thresholding operation may involve filtering the k indications of the selected destination devices, so that only those devices associated with costs or utilities inside of a predetermined range are candidates for final selection. For example, each cost can be compared against a threshold and the corresponding destination device only provided as a candidate for selection if the cost is below a threshold. Likewise, each utility can be compared against a threshold and the corresponding destination device only provided as a candidate for selection if the utility is above a threshold. Thresholds may be absolute, predetermined values, or relative values. For example, thresholds may be obtained by multiplying the average cost or utility by a constant value greater than one, e.g. 1.5 or 2.

The hashing operation is used to select, from among the candidate destination devices (e.g. the k devices output from the thresholding operation), one destination device. Rather than performing this selection arbitrarily or randomly, the hashing operation selects a destination device based on address information contained in the data packet. This selection is consistent in the sense that two packets having the same address information are routed to the same destination device. The hashing operation generates a value based on the addressing information, for example according to a repeatable mapping, and the destination device is selected based on this hash value. This facilitates consistent routing for the same data flow, while allowing different routing for different data flows. Other approaches, such as randomized or alternating selection, can be used to select one of the candidate destination devices. Once a destination device is selected, a packet forwarder 350 receives the indication of destination device (and associated interface) and forwards the packet toward that destination device.

Figure 4:
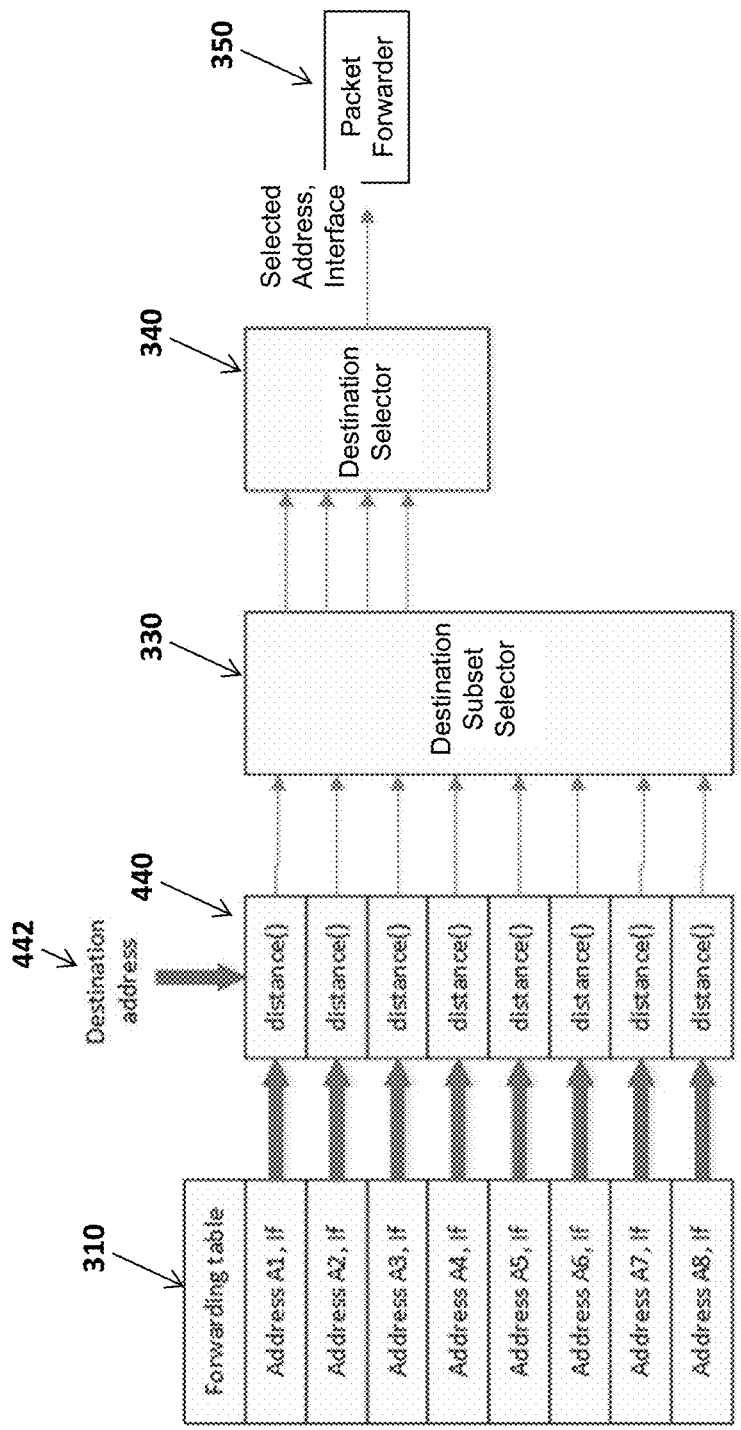
FIG. 4 is a block diagram illustrating forwarding plane operation according to another embodiment of the present invention, with forwarding cost being equated to distance to a destination.

FIG. 4 illustrates a particular variant of the embodiment of FIG. 3, in which the cost determiner 340 is replaced with a distance determiner 440. The distance determiner receives an indication 442 of the further destination address and determines distance from each address in the forwarding table to the further destination address. The distance can correspond to the distance along the surface of a sphere, for example as calculated using a Haversine function or other comparable function. The distance value may or may not be an accurate representation of actual distance. However, the distance value should be a monotonic function of actual distance.

Details of a destination subset selector, also referred to as a selector function, according to various embodiments of the invention, will now be described. The selector function will be described principally with respect to selecting a destination with low cost, particularly corresponding to a short distance from destination device to further destination device.

In order to select the k destination devices with lowest costs (or highest utilities) out of a total of n>k destination devices, the costs (e.g. computed distances) require at least partial sorting. Sorting is computationally intensive, generally O(n log n), which does not scale well to scenarios in which packets are forwarded at a rate on the order of $10^8$ packets per second. However, it has been recognized by the inventor that it is not necessary to perform a complete sort of all the destination devices by cost. Rather, the destination devices only need to be sorted sufficiently so that those with the k lowest cost can be identified. The corresponding function is referred to as a "n,k selector." In various embodiments, the n,k selector is implemented in a parallelized architecture in electronics hardware in order to provide a useful level of performance.

Figure 5:
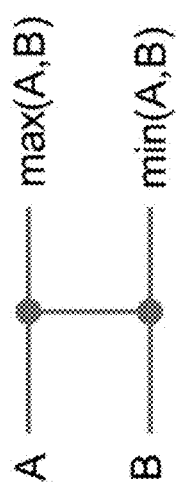
FIG. 5 illustrates a comparator element of a sorting network, according to the prior art.
Figure 6:
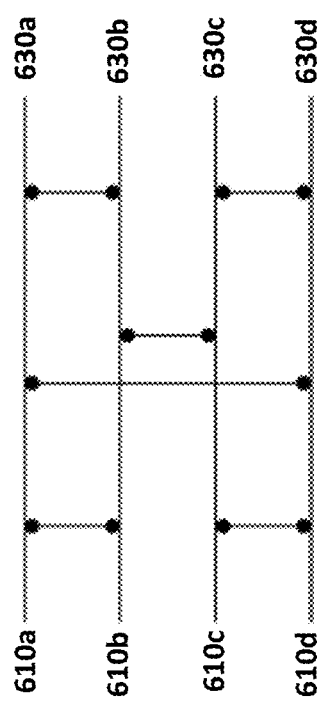
FIG. 6 illustrates a four-element sort network, according to the prior art.

"The Art of Computer Programming," Volume 3, Searching and Sorting, Section 5.3.4, Donald Knuth, Addison-Wesley, 2014 describes hardware sort networks. The key element of a hardware sort network is the comparator, as illustrated in FIG. 5. The comparator takes two input values A and B and provides, at a first output, the maximum of A and B, and at a second output, the minimum of A and B. Such comparators can be combined together in networked configurations to perform sorting functions. For example, FIG. 6 illustrates a four-element sort network, which accepts arbitrary values at four inputs 610a to 610d and outputs these values at outputs 630a to 630d, such that the value at 630a is the highest of the input values, the value at 630b is the second highest, the value at 630c is the second lowest, and the value at 630d is the lowest. This network can execute in three steps. In step one, inputs 610a and 610b are compared and so are inputs 610c and 610d. The second step compares outputs of the first step, and the final step compares outputs of the second step. There are general approaches for building sort networks of arbitrary size, for example a bubble sort, or a bitonic sort. However these approaches generally have super-linear performance which makes them poor candidates for a high performance system. However, a catalog of sort networks for a small number of inputs (up to 16 inputs) is available. These networks have sub-linear performance and are good candidates for use in the present invention.

It is noted that, while the networks are shown as sorting values (e.g. costs or utilities), ancillary information, such as network addresses, can be attached to these values and sorted along with the values. That is, the ancillary information follows the values through the sorting network but does not affect the outcome of the sort, either because it is ignored by the comparators or because its weight in the overall value does not affect outcome of comparator operations.

Figure 7:
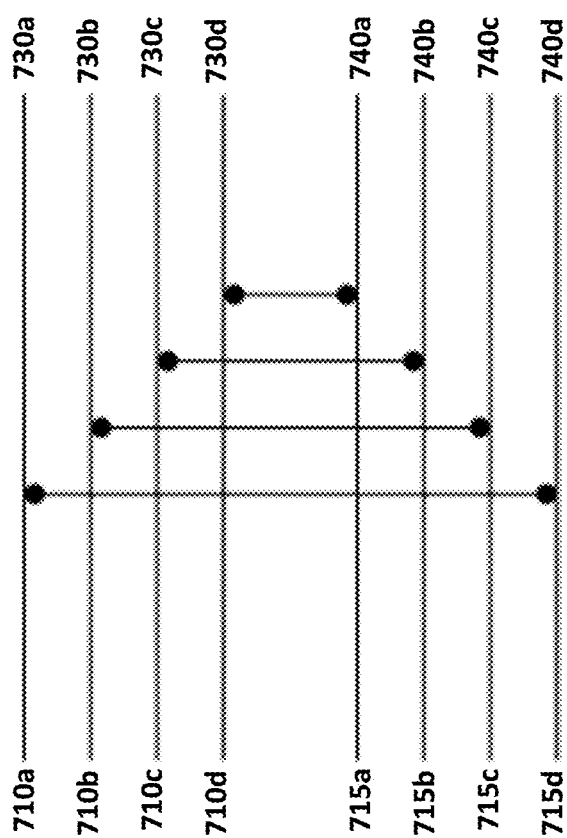
FIG. 7 illustrates a selector component including multiple comparator elements, according to the prior art.

FIG. 7 illustrates a selector component, which may be utilized according to various embodiments of the present invention. This type of selector component is referred to herein as an Alekseev selector, after its apparent creator. The selector is built using four comparators as in FIG. 5, networked together. The selector receives arbitrary values at four first inputs 710a to 710d and four second inputs 715a to 715d, and produces at outputs 730a to 730d the four highest of the received values and at outputs 740a to 740d the four lowest of the received values. Input to the first and second inputs should be fully sorted, so that value at 710a is the highest of the input values among the first inputs, the value at 710b is the second highest, the value at 710c is the second lowest, and the value at 710d is the lowest, and also so that value at 715a is the highest of the input values among the second inputs, the value at 715b is the second highest, the value at 715c is the second lowest, and the value at 715d is the lowest. Full sort networks can be used to provide these sorted values. That is, four-element sort networks as in FIG. 6 can be coupled to the inputs of the Alekseev selector of FIG. 7.

Figure 8:
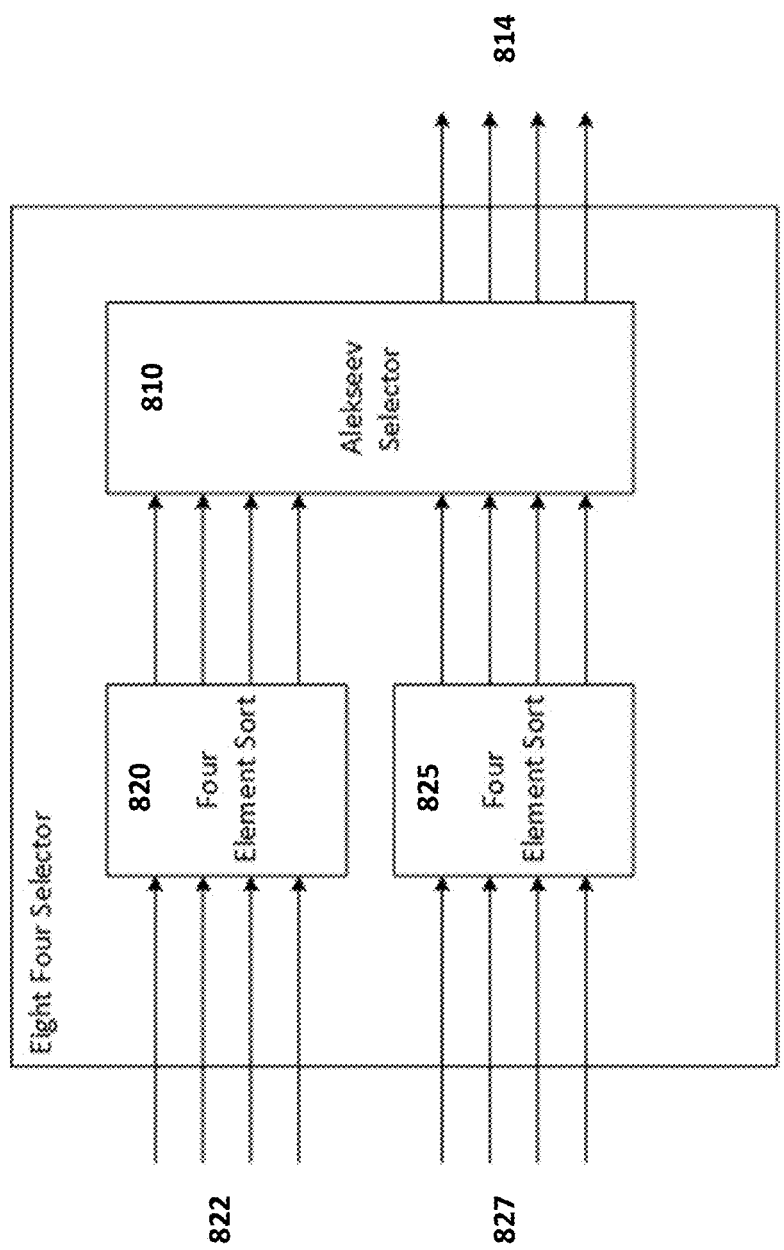
FIG. 8 illustrates a full selector, according to the prior art and utilized in embodiments of the present invention.

FIG. 8 illustrates this configuration, which is referred to as an 8,4 selector. Although an 8,4 selector is shown, an n,n/2 selector can be similarly constructed for arbitrary (even) values of n. The selector selects and provides, at output 814, the n/2 smallest elements, in a generally unsorted manner. The selector receives at input 822 a first unsorted four-element set and receives at input 827 a second unsorted four-element set. In particular, FIG. 8 illustrates an Alekseev selector 810, coupled to outputs of two four-element full sort networks 820, 825, operating in parallel.

Figure 9:
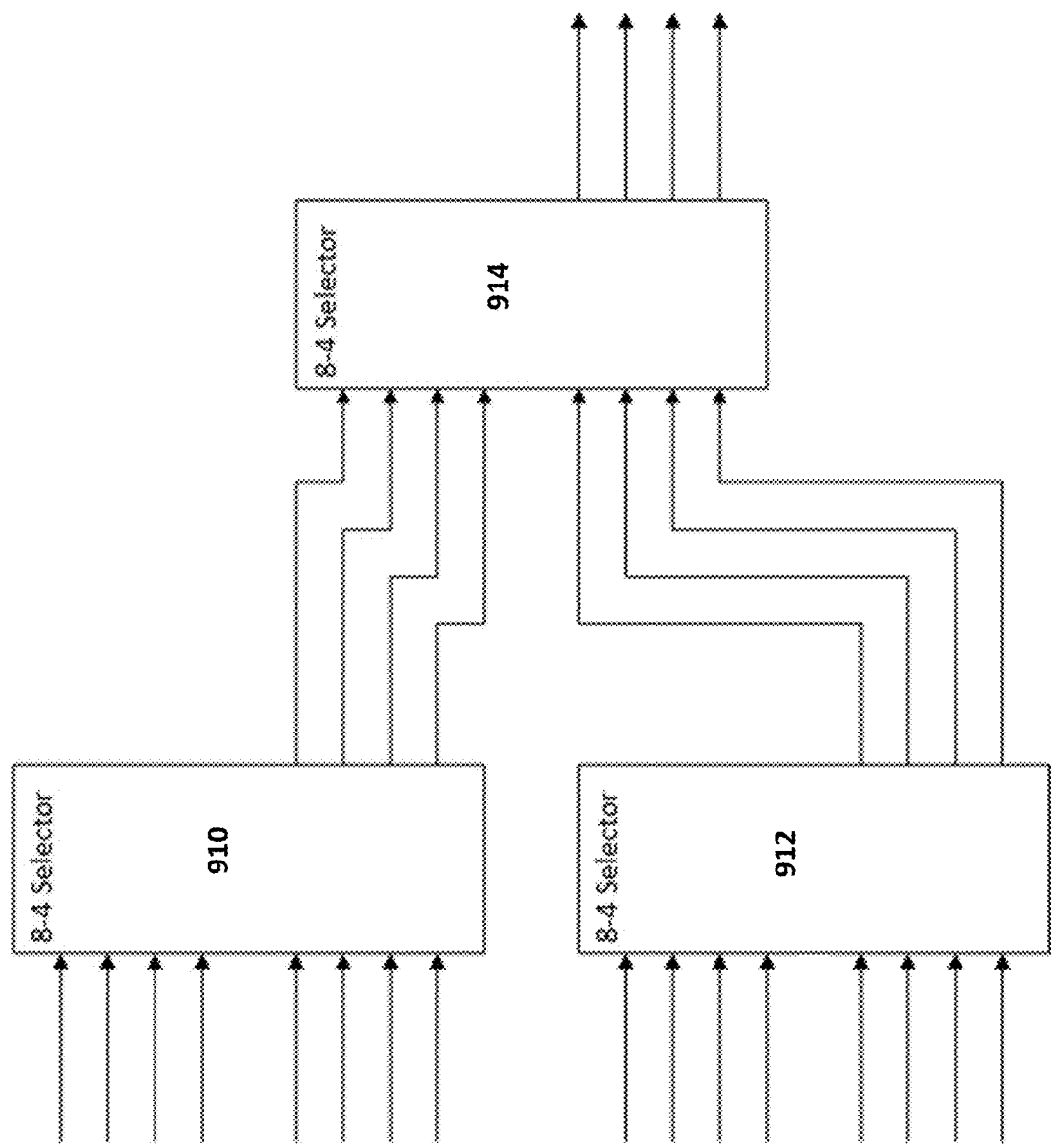
FIG. 9 illustrates a tree comprising three selectors each as in FIG. 8, according to an embodiment of the present invention.

Embodiments of the present invention combine a sort network with one or more (e.g. Alekseev) selectors to implement an n,k selector. FIG. 9 illustrates a tree comprising three 8,4 selectors 910, 912, 914, each as in FIG. 8, to implement a 16,4 selector. More (e.g. 8,4) selectors can be combined to extend this tree structure as necessary, to implement selectors with different numbers of inputs and outputs. The selector of FIG. 9 accepts arbitrary (unsorted) inputs and produces as outputs the elements with the four lowest costs. The execution time of such a selector tree scales with $\log_2(n/k)$, providing desirably good performance at scale. In one example embodiment, n may be approximately 1000, and k may be approximately 4. In another example embodiment, n may be approximately 8 or 16, and k may be approximately 4. The configuration of FIG. 9 can be expanded to an arbitrary number of stages. In general, a plurality of selector elements can be provided which is arranged into a tree having n stages. A first one of the n stages has n selector elements operating in parallel (similar to elements 910, 912). Each successive one of the n stages has one fewer selector element than an immediately prior one of the n stages, for example as with FIG. 9 the first stage having two selector elements 910, 912 and the second stage having one selector element 914. Output of selector elements in each of the first n−1 stages is provided as input to selector elements of a next one of the n stages. The plurality of selector elements are cooperatively configured to determine the subset of destination devices. By providing a tree network of selectors of this form, the approach can be scaled to accept arbitrarily large numbers of inputs and select the k destination devices with lowest associated costs or highest associated utilities.

Figure 10:
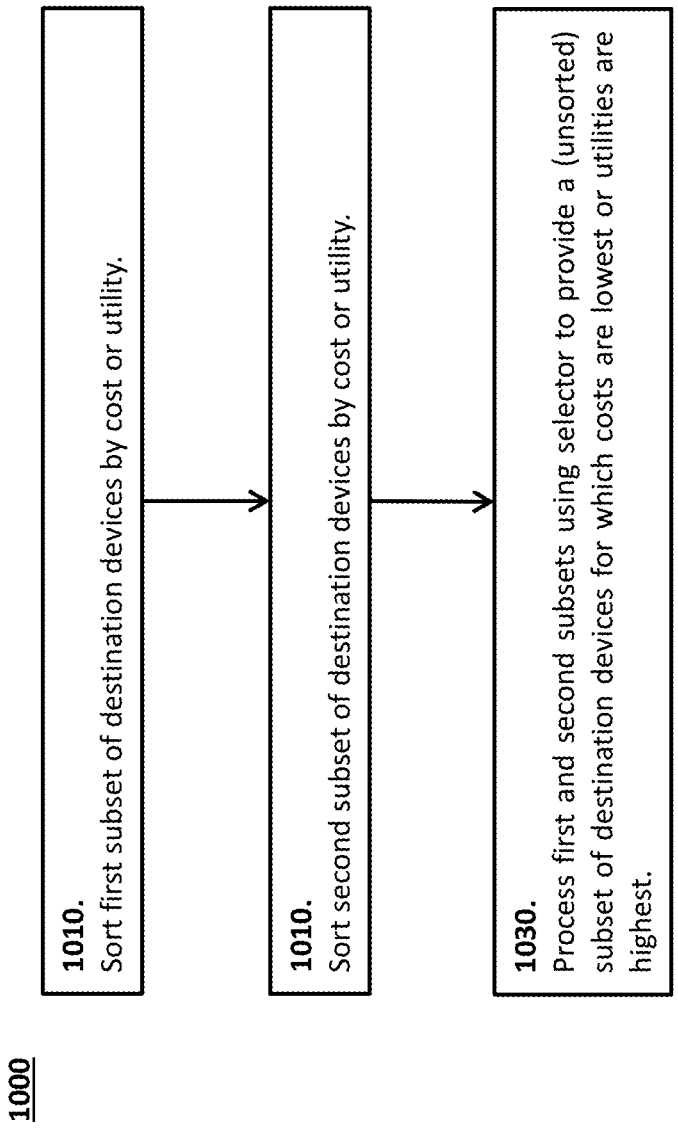
FIG. 10 illustrates a method of determining an unsorted subset of k destination devices for which costs are lowest or utilities are highest, according to an embodiment of the present invention.

FIG. 10 illustrates a method 1000 of determining an unsorted subset of k destination devices for which costs are lowest or utilities are highest. This method reflects the configuration and operation of the selector and sort networks as described above, for example with respect to FIG. 8. The method includes sorting 1010, for example using a first sort network, a first subset of destination devices by costs or utilities. The method includes sorting 1020, for example using a second sort network in parallel with the first sort network, a second (typically disjoint) subset of destination devices by costs or utilities. The method further includes processing 1030 the first and second subsets using a (e.g. Alexseev) selector. The selector provides as output a subset of k of the destination devices for which costs are lowest or utilities are highest. Notably this provided subset is itself generally unsorted with respect to cost and utility.

The method 1000 can correspond to operation of one selector (e.g. selector 914 of FIG. 9). The method can include operations corresponding to those of other prior selectors feeding into the final selector. For example, the first and second subsets may be provided, respectively, as unsorted outputs of first and second prior selectors. The first prior selector (e.g. selector 910) is configured to process a first pair of subsets of the plurality of destination devices, each of the first pair of subsets sorted by costs or utilities. The second prior selector (e.g. selector 912) is configured to process a second pair of subsets of the plurality of destination devices, each of the second pair of subsets sorted by costs or utilities. Further prior selectors feeding respectively into the first and second prior selectors in a tree-like manner may also be provided, as necessary.

Although embodiments of the present invention are described primarily with respect to routing in satellite mesh networks, it should be appreciated that the present invention may also be applied in other network scenarios, such as in other geometric or geographic based routing systems not necessarily involving satellites, or in other non-geometric or non-geographic based routing systems, for example in which packets are routed solely based on network address (e.g. arranged by nested subnets) and network topology.

Embodiments of the present invention can be implemented using electronics hardware, software, or a combination thereof. In some embodiments, the forwarding plane is implemented by one or multiple computer processors executing program instructions stored in memory. In some embodiments, the forwarding plane is implemented partially or fully in hardware, for example using one or more field programmable gate arrays (FPGAs) or application specific integrated circuits (ASICs) to rapidly perform the processing operations required for implementing forwarding plane operations. The forwarding plane operations can include determining costs or utilities associated with forwarding data packets to destination devices, determining subsets of destination devices having lowest costs or highest utilities, selecting one of the destination devices, and forwarding of a data packet to the selected destination device. The determining of subsets of destination devices can be performed using sorting and selection hardware which include comparators as described above for example with respect to FIGS. 5 to 9. The hardware or software overall can have the architecture described above for example with respect to FIGS. 3 and 4.

FIG. 11 is a schematic diagram of an electronic device 1100 that may perform any or all of operations of the above methods and features explicitly or implicitly described herein, according to different embodiments of the present invention. For example, a computer equipped with network function may be configured as electronic device 1100.

As shown, the device includes a processor 1110, such as a Central Processing Unit (CPU) or specialized processors such as a Graphics Processing Unit (GPU) or other such processor unit, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the device 1100 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for routing a data packet in a network, the method comprising:
   for each one of a plurality of destination devices capable of further handling of the data packet for routing to a further destination, determining a respective cost or utility associated with forwarding the data packet to said one of the plurality of destination devices;
   determining an unsorted subset of the destination devices using a selector, the selector providing, as output, the unsorted subset consisting of a predetermined number k of the destination devices for which said costs are lowest or said utilities are highest, said subset being unsorted with respect to cost and utility;
   selecting one of the subset of the destination devices; and
   forwarding the data packet to said selected one of the subset of the destination devices.

2. The method of claim 1, wherein the cost or utility is a cost or utility associated with forwarding the data packet from said one of the plurality of destination devices toward the further destination.

3. The method of claim 1, wherein the cost corresponds to a distance from said one of the plurality of destination devices to the further destination.

4. The method of claim 1, wherein said determining the subset is performed without fully sorting the plurality of destination devices by said cost or utility.

5. The method of claim 1, wherein said determining the subset comprises:
   sorting a first subset of the plurality of destination devices by said costs or utilities;
   sorting a second subset of the plurality of destination devices by said costs or utilities, the second subset disjoint from the first subset;
   processing the first and second subsets using the selector.

6. The method of claim 5, wherein one or both of:
   the first subset is provided as unsorted output of a first prior selector configured to process a first pair of subsets of the plurality of destination devices, each of the first pair of subsets sorted by said costs or utilities; and
   the second subset is provided as unsorted output of a second prior selector configured to process a second pair of subsets of the plurality of destination devices, each of the second pair of subsets sorted by said costs or utilities.

7. The method of claim 1, wherein the selector is an n,k selector comprising a plurality of selector elements arranged in a tree having n stages, a first one of the n stages having n selector elements operating in parallel and each successive one of the n stages has at least one fewer selector elements than an immediately prior one of the n stages, wherein output of selector elements in each of the first n−1 stages is provided as input to selector elements of a next one of the n stages, wherein each of the plurality of selector elements is configured to:
   sort a first respective subset of the plurality of destination devices by said costs or utilities;
   sort a second respective subset of the plurality of destination devices by said costs or utilities, the second respective subset disjoint from the first respective subset;
   process the first and second respective subsets using the selector element subsequent to said sorting, the selector element providing as output a plurality of destination devices, from among the first respective subset and the second respective subset, for which said costs are lowest or said utilities are highest, said plurality being unsorted with respect to cost and utility.

8. The method of claim 1, wherein selecting one of the subset of the destination devices comprises selecting only from members of the subset which have associated costs or utilities which are within a predetermined range.

9. The method of claim 1, wherein selecting one of the subset of the destination devices is based on addressing information contained within the data packet.

10. An apparatus for routing a data packet in a network, the apparatus comprising:
    a cost determiner configured, for each one of a plurality of destination devices capable of further handling of the data packet for routing to a further destination, to determine a respective cost or utility associated with forwarding the data packet to said one of the plurality of destination devices;
    a destination subset selector configured, to determine an unsorted subset of the destination devices, the destination subset selector further configured to provide, as output, the unsorted subset consisting of a predetermined number k of the destination devices for which said costs are lowest or said utilities are highest, said subset being unsorted with respect to cost and utility;
    a destination selector configured to select one of the subset of the destination devices; and
    a packet forwarder configured to forward the data packet to said selected one of the subset of the destination devices.

11. The apparatus of claim 10, wherein the destination subset selector is implemented using a processor operatively coupled to memory, the memory storing program instructions that, when executed by the processor, cause the processor to implement the destination subset selector.

12. The apparatus of claim 10, wherein the destination subset selector is implemented using dedicated data processing hardware.

13. The apparatus of claim 10, wherein the cost or utility is a cost or utility associated with forwarding the data packet from said one of the plurality of destination devices toward the further destination.

14. The apparatus of claim 10, wherein the cost corresponds to a distance from said one of the plurality of destination devices to the further destination.

15. The apparatus of claim 10, wherein the apparatus is configured to determine the subset without fully sorting the plurality of destination devices by said cost or utility.

16. The apparatus of claim 10, wherein the apparatus is configured to determine the subset by:
sorting a first subset of the plurality of destination devices by said costs or utilities;
sorting a second subset of the plurality of destination devices by said costs or utilities, the second subset disjoint from the first subset;
processing the first and second subsets using the destination subset selector.

17. The apparatus of claim 16, wherein one or both of:
the first subset is provided as unsorted output of a first prior selector configured to process a first pair of subsets of the plurality of destination devices, each of the first pair of subsets sorted by said costs or utilities; and
the second subset is provided as unsorted output of a second prior selector configured to process a second pair of subsets of the plurality of destination devices, each of the second pair of subsets sorted by said costs or utilities.

18. The apparatus of claim 10, wherein the destination subset selector is an n,k selector comprising a plurality of selector elements arranged in a tree having n stages, a first one of the n stages having n selector elements operating in parallel and each successive one of the n stages has one fewer selector element than an immediately prior one of the n stages, wherein output of selector elements in each of the first n−1 stages is provided as input to selector elements of a next one of the n stages, the plurality of selector elements cooperatively configured to determine the subset, wherein each of the plurality of selector elements is configured to:
sort a first respective subset of the plurality of destination devices by said costs or utilities;
sort a second respective subset of the plurality of destination devices by said costs or utilities, the second respective subset disjoint from the first respective subset;
process the first and second respective subsets using the selector element subsequent to said sorting, the selector providing as output a plurality of destination devices, from among the first respective subset and the second respective subset, for which said costs are lowest or said utilities are highest, said plurality being unsorted with respect to cost and utility.

19. The apparatus of claim 10, wherein selecting one of the subset of the destination devices comprises selecting only from members of the subset which have associated costs or utilities which are within a predetermined range.

20. The apparatus of claim 10, wherein selecting one of the subset of the destination devices is based on addressing information contained within the data packet.

* * * * *